UNITED STATES PATENT OFFICE.

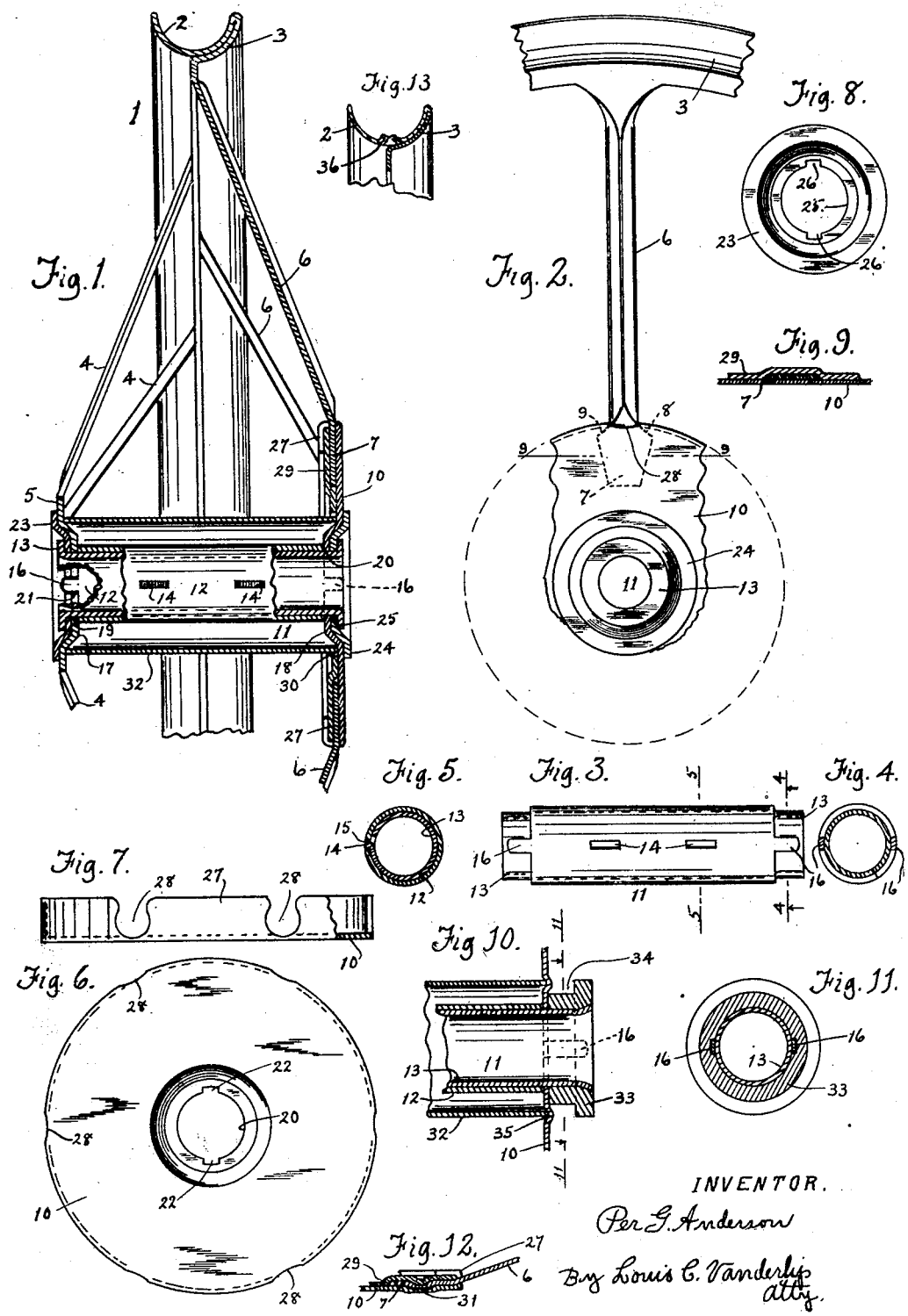

PER G. ANDERSON, OF ELKHART, INDIANA.

WHEEL.

1,370,723.     Specification of Letters Patent.     Patented Mar. 8, 1921.

Application filed April 17, 1919. Serial No. 290,681.

*To all whom it may concern:*

Be it known that I, PER G. ANDERSON, a citizen of the United States, residing in the city of Elkhart, county of Elkhart, Indiana, have invented certain new and useful Improvements in Wheels, of which the following is a specification.

My invention relates to vehicle wheels and especially to metal wheels for carriages.

The principal object of my invention is to improve the metal wheel covered by my Patent Number 1,084,875, issued on January 20, 1914, which improvements are shown, described and claimed hereinafter and contemplate superior strength, simplicity and lasting qualities.

Other objects of my invention are described and mentioned herein.

The preferred embodiment of my invention is well illustrated in the accompanying drawing in which Figure 1 is a vertical section of a wheel fragment embodying several of my improvements; Fig. 2 is a fragment in elevation showing one wheel spoke, a part of the rim and hub; Fig. 3 is a view of the hub barrel separately; Fig. 4 is a section taken on the line 4—4 of Fig. 3; Fig. 5 is a section taken on the line 5—5 of Fig. 3; Fig. 6 is a side elevation of the hub flange; Fig. 7 is a view of the edge of the hub flange; Fig. 8 is an elevation of the hub barrel washers; Fig. 9 is a view in section taken on the line 9—9 of Fig. 2; Fig. 10 is a section through a hub fragment showing a modification; Fig. 11 is a section taken on the line 11—11 of Fig. 10; Fig. 12 is a fragment in section showing a modification of the spoke fastening means; and Fig. 13 is a rim fragment in section showing a modification or means for preventing tire creeping.

Similar numerals of reference indicate like members and parts of members throughout the several views on the drawing.

Referring to the drawing in detail, the numeral 1 indicates generally a wheel made of sheet metal and having integral rim portions 2 and 3, the spokes 4, 4 and 6, 6, being connected integrally with the rim portion 3, and the spoke flange 5 being integral with the spokes 4, as shown and described in my Patent Number 1,084,875, issued January 20, 1914. The inner or hub end of each spoke 6 is provided with an enlarged head member 7 which is preferably integral therewith and has the opposed shoulders 8 and 9 thereon. All of the spokes 6 are connected with an annular hub flange, or disk, 10 to which said spoke heads 7 are secured in an improved manner, as hereinafter described, which hub flange is mounted upon the hub barrel 11 opposite the spoke flange 5 which is also mounted upon the hub barrel 11.

The barrel 11 is preferably formed of two flat pieces of sheet metal rolled into cylindrical formation, one sleeving the other, the outer member or sleeve 12 being somewhat shorter than the inner member 13, both ends of the latter extending beyond the ends of the former. The hub barrel members 12 and 13 may be fastened rigidly together by a plurality of lugs 14, 14 integral with member 13 and pressed therefrom outwardly and radially into the slots 15, 15 formed in the sleeve 12. See Figs. 3 and 5. The sleeve member 12 is provided with integral longitudinally extending stop lugs 16, 16 at each end thereof, of which lugs there may be a plurality at each end. In Figs. 3 and 4 two oppositely disposed lugs 16 are indicated or shown, the actual disclosure being made in Fig. 4, the opposite end of the hub barrel 11 being similar in that respect, but any suitable number of such lugs may be used for the purpose hereinafter mentioned.

Both spoke flange 5 and the hub flange 10 may be centrally and inwardly dished at 17 and 18, respectively, and both may be centrally apertured at 19 and 20, respectively, to carry the opposite ends of the hub barrel member 13 which are arranged therein and project therethrough. At opposite edges of the hub barrel bearing apertures 19 and 20, respectively, the slots 21, 21 and 22, 22 may be formed, only one of the former being shown in Fig. 1. See also Fig. 6.

The numerals 23 and 24 indicate a pair of dished annular washers of substantially similar structure (Fig. 8) each of which is centrally apertured at 25, said washers being mounted upon opposite ends of the hub barrel member 13 and primarily adapted to protect the members 5 and 10 against wear and injury. The edge of the aperture 25 of each washer may be provided with slots 26, 26, adapted to register with slots 21, 21 and 22, 22, formed in said spoke flange and hub flange, 5 and 10, respectively. When the hub barrel 11 is assembled in the spoke flange 5 and the hub flange 10, the opposite ends of the member 12 engage against the inner periphery of the dished portion of the spoke and hub flanges, the lugs 16 at one end of said hub barrel engaging in slots 22, 22 of said hub flange 10, and slots 26, 26 of the washer 24, and the lugs 16, 16 at the opposite end of said hub barrel engage the slots 21, 21 of the spoke flange 5 and slots 26, 26 of the washer 23. The opposite ends of the hub barrel member 13, which project through each washer 23 and 24, are then bent outward into the dished portions of said washers and against the outer face thereof to effect a rigid assembly of said parts, in which assembly the lugs 16 serve to confine the hub barrel 11 against rotation in its bearing apertures in said spoke and hub flanges, as described.

Numerals 27, 27 indicate a plurality of ears formed on the outer periphery of the hub flange 10, between which ears are located the spoke notches 28, 28 in which the inner ends of the spokes 6 are arranged. The numeral 29 indicates an annular disk which may be formed of sheet metal and centrally apertured at 30, and between which disk and the hub flange 10 the spoke heads 7 are clamped when the ears 27 of said hub flange are bent inwardly upon the inner periphery of said disk, and in which arrangement of members the spoke head shoulders 8 and 9 are overlaid by the ears 27, whereby outward radial movement of the spokes 6 is effectually prevented. When thus assembled, the disk 29 and the spoke head 7 may be indented with a punch, as indicated at 31 in Fig. 12, to effect extra rigidity.

In Fig. 9 there is indicated a structure which may be resorted to to assist in restricting lateral movement of the spoke head 7, in which structure the disk 29 is bent around the spoke head 7 upon the inner face of the hub flange 10.

The numeral 32 indicates a cylindrical false hub member encompassing the hub barrel 11 and engaging the inner faces of the members 5 and 10 around the dished portions thereof.

In the modification shown in Fig. 10 the numeral 33 indicates a flanged cap member mounted upon the inner end of the hub barrel 11 as a substitute for the washer 24, in which structure the member 13 and the lugs 16 are somewhat lengthened, and in which structure the inner face of the annular cap member 33 may be in contact with the outer face of the hub flange 10 being secured in position by the expansion or outward bending of the end of the hub member 13. An annular groove 34 is effected between the flange of the cap member 33 and the face of the hub flange 10 which groove is adapted to be engaged by a spring catch—not shown, but well known in the art, for the retention of the wheel on the axle.

The numeral 35 indicates an annular groove formed in the hub flange 10 (Fig. 10) into which the end of the false hub 32 is arranged, the opposite end of said false hub being carried by a spoke flange 5 as heretofore described in connection with Fig. 1. The numeral 36 indicates one of a series of indentations which may be formed circumferentially of the rim 2 and within the tire groove thereof, which indentations may be formed with a punch, or otherwise, and which project into the tire groove of the rim to engage the rubber tire—not shown, whereby tire creeping and the separation of the tire joint is prevented.

I claim:

1. In a device of the character described, a wheel rim; spokes connected with said rim, the inner end of each spoke being provided with a head; a hub flange provided with a plurality of ears or lugs on its outer periphery and between which ears said spokes are arranged; a disk disposed on the other side of said spoke heads, said hub flange ears being bent over and across the outer periphery of said disk and inwardly upon the inner face of said disk, said disk being bent around each of said spoke heads transversely thereof and upon the inner face of said hub flange; and means for preventing radial movement of said spokes.

2. In a device of the character described, a hub barrel composed of inner and outer tubular members, the inner member projecting beyond the end of the outer member, said outer hub member having a stop lug overlying the inner hub member; a spoke flange mounted upon said inner hub member and provided with a recess which is engaged by said stop lug; and means for rigidly securing said spoke flange to said hub barrel.

3. In a device of the character described, a hub barrel composed of inner and outer cylindrical members, the inner member projecting beyond the end of the outer member, said outer hub barrel member having a plurality of stop lugs projecting therefrom and beyond the outer periphery of one end of said inner hub barrel member; means for rigidly securing said hub barrel members together; a spoke flange mounted upon said inner hub barrel member and provided with a plurality of recesses which are engaged by said stop lugs; and means for fastening said spoke flange upon said hub barrel.

4. In a device of the character described, a centrally apertured disk; a hub barrel, the end whereof is arranged within and projects through said disk aperture; a complementary lug and slot connection between said hub barrel and said disk; a flanged cap member mounted upon said hub barrel end; and means for securing said cap member upon said hub barrel.

5. In a device of the character described, a centrally apertured disk; a hub barrel, the end whereof is arranged within and projects through said disk aperture; means for rigidly connecting said disk and hub barrel; and a flanged cap member carried upon said hub barrel end, the latter being expanded or bent outward into engagement with said cap member to rigidly connect it with said hub barrel end.

6. In a device of the character described, a centrally apertured disk provided with an annular groove encompassing said disk aperture; a hub member secured within said disk aperture; and a false hub member encompassing said hub member and having its end arranged in said groove in said disk.

7. In a device of the character described, a hub member; a centrally apertured disk member carried by said hub, the end of said hub member projecting through said disk aperture; a washer on said hub end; a complementary lug and slot connection between said disk, washer and hub members; and means for securing said disk and washer upon said hub to prevent longitudinal displacement thereof.

In testimony whereof I have affixed my signature this 11th day of April, 1919.

PER G. ANDERSON.